US008277221B2

(12) United States Patent
Damron et al.

(10) Patent No.: US 8,277,221 B2
(45) Date of Patent: Oct. 2, 2012

(54) TALKING PLUSH NOVELTY TOY AND INTERACTIVE STORY BOOK FOR TEACHING A READER DESIRED BEHAVIORAL PATTERNS TO PROTECT ONESELF FROM SEXUAL PREDATORS

(76) Inventors: Celeste Damron, Del Mar, CA (US); Cynthia Irvine, Medford, OR (US); Cecile Irvine, Simi Valley, CA (US); Justin Clarke Gomez Tagle, legal representative, Simi Valley, CA (US)

(*) Notice: Subject to any disclaimer, the term of this patent is extended or adjusted under 35 U.S.C. 154(b) by 1879 days.

(21) Appl. No.: 11/205,539

(22) Filed: Aug. 16, 2005

(65) Prior Publication Data

US 2006/0127866 A1 Jun. 15, 2006

Related U.S. Application Data

(60) Provisional application No. 60/636,078, filed on Dec. 15, 2004.

(51) Int. Cl.
*G09B 19/00* (2006.01)
(52) U.S. Cl. ........................................................ 434/236
(58) Field of Classification Search .................. 434/155, 434/169, 178, 236, 308, 317; 446/297
See application file for complete search history.

(56) References Cited

U.S. PATENT DOCUMENTS

| | | | | |
|---|---|---|---|---|
| 4,341,521 A | | 7/1982 | Solomon | 434/236 |
| 5,059,149 A | * | 10/1991 | Stone | 446/73 |
| 5,279,514 A | * | 1/1994 | Lacombe et al. | 446/297 |
| 5,387,107 A | | 2/1995 | Gunter et al. | 434/238 |
| 5,746,637 A | | 5/1998 | Hunt | 446/72 |
| 5,795,213 A | * | 8/1998 | Goodwin | 446/297 |
| 6,000,987 A | * | 12/1999 | Belin et al. | 446/175 |
| 6,089,943 A | | 7/2000 | Lo | 446/175 |
| 6,106,358 A | * | 8/2000 | McKenzie | 446/299 |
| 6,160,540 A | * | 12/2000 | Fishkin et al. | 345/184 |
| 6,193,579 B1 | * | 2/2001 | Mak | 446/297 |
| 6,330,427 B1 | * | 12/2001 | Tabachnik | 434/317 |
| 6,434,769 B1 | * | 8/2002 | Koenig | 5/636 |
| 6,780,076 B2 | * | 8/2004 | Horchler et al. | 446/29 |
| 6,882,824 B2 | * | 4/2005 | Wood | 434/308 |
| 7,035,583 B2 | * | 4/2006 | Ferrigno et al. | 434/308 |
| 7,261,612 B1 | * | 8/2007 | Hannigan et al. | 446/175 |
| 2002/0197930 A1 | | 12/2002 | Derraugh et al. | 446/147 |

* cited by examiner

*Primary Examiner* — Kurt Fernstrom (57) ABSTRACT

A portable talking toy having an audio signal producer is provided with an educational book, which contains indiciums noted on at least one of the pages that are the same words or phrases uttered by the talking toy. The book has a plurality of numbered pages containing parts of a story. The story is used to teaching desired behavioral and psychological patterns that will aid the reader in learning how to self protect from sexual predators. The talking toy is provided with a pressure switch in the form of a button attached externally to the toy causing a sound to be emitted from the electronic voice box stored inside the toy. It will may have memory capable of storing and emitting words and sounds/words associated with indiciums noted in the story book and a microphone device for providing audible signals that enable sound, including music stored with each specific sound as background. The specific words communicate messages related to desired behavioral patterns. The books will contain multiple illustrations and indicium prompts indicating when the reader should press the button on the toy to hear the word or sound. Interaction between the characters in said book is purposed to encourage self-awareness in a reader encouraging him/her to pull cord or press the button on the toy thereby reinforcing the learning of the desired behavioral patterns.

9 Claims, 6 Drawing Sheets

TALKING PLUSH NOVELTY TOY AND INTERACTIVE STORY BOOK FOR TEACHING A READER DESIRED BEHAVIORAL PATTERNS TO PROTECT ONESELF FROM SEXUAL PREDATORS

RELATED APPLICATION

This application claims the benefit of priority under 35 U.S.C. §119(e) to U.S. Provisional Application No. 60/636,078 filed Dec. 15, 2004, the contents of which are hereby incorporated by reference in their entirety.

FIELD OF THE INVENTION

The present invention relates generally to systems and methods for a personalized and/or interactive story book, and method of teaching a young reader a desired psychological and/or behavioral pattern designed to protect oneself from sexual predators through sounds of words and phrases, animal noises and background music elicited from the soft plush novelty toy via an audio signal device, which is associated with a character in the accompanying story book where there are indiciums prompting the reader to interact with the toy.

BACKGROUND OF THE INVENTION

Talking books are known and are a popular item for children, especially young children who are learning to, or have just learned to, read. The sound source, whatever its structure, is keyed to the story in the book so that the sounds produced bear some relationship to the content of the story in the form of indiciums on at least one page of the book prompting the reader to press a button on the toy, which makes the sounds; or actual words or phrases will appear as indiciums on at least on page of the story book. These types of books are enjoyable and educational for the child, and in addition they are unlimited in use in that they are able to provide an active role for the child. The child can play the sound with the toy while not reading the book, making the learning experience one in which the child can determine where and when it is used or played.

A child's interest and imagination are enhanced when the child is able to take a more active role in reading or listening to the story through the use of the associated toy. To provide a more enjoyable and educational reading and learning experience, it is desired to provide a novelty item or toy known to those of ordinary skill in the art as a stuffed toy and will appreciate that stuffed toys defined herein are for exemplary purposes only, and that other animals or mythical creatures will be created, all with a sound source that is separate from the book. The sound source produces realistic sounds of human speech or a specific animal noise exemplified in the figures below as the whinny or snort of a horse. In addition to realistic sounds, the toy will play accompanying soothing music, known to those in the art to assist in the learning process, including reading and enhancement of abstract reasoning skills. This gives the reading novelty item a greater play and educational value. By permitting the sound source to be separate from the book, the reader, particularly a young child, can more actively and more realistically act out the story along with the primary character in the book. This gives the child a greater feeling of participation in the reading process and stimulates the child's interest in the subject matter. Versions of the story will include different reading levels and sounds that are appropriate to the age and developmental ability of the reader. In story books adapted for younger readers aged 3-6, there will be more colorful, plentiful and larger pictures. A story version directed to an older child will have less pictures and more sophisticated language appropriate for that target age group.

PRIOR ART

1. U.S. Pat. No. 4,341,521A—Psychotherapeutic device to be used by a psychotherapist with a resistant or non-communicative child utilizing a puppet and book illustrating a traumatic event in the child's life.
2. U.S. Pat. No. 6,089,943A—Educational toy with barcode scanner, book and audible message teaching the alphabet and numbers.
3. U.S. Pat. No. 5,387,107A—Story book teaching behavioral pattern with photograph likeness of reader attached therein and construed to be the character within the book encouraging repetition of words to reinforce learning concepts.
4. U.S. Pat. No. 6,330,427B1—Novelty device with audio capabilities and associated book and pointer to activate audio sound within novelty device designed to stimulate an interest in reading.
5. US20020197930A1—Stuffed toy with an integral book whereby the body of the toy forms the front and back covers of the book and the pages are secured within thereby minimizing the loss of the book. As a child is more apt to know where the toy is, it thus provides entertainment and educational value of reading.
6. U.S. Pat. No. 5,746,637—Story book whereby torso of stuffed toy is attached between cardboard sheets of the back cover of the book and the back cover would have an illustration of the back, and remaining body of the toy. The front of book has internal pages attached in a conventional manner. The story could be *Goldilocks and the Three Bears*, and the attached stuffed toy would be a bear designed to encourage enjoyment of reading.

SUMMARY OF THE INVENTION

It is the goal and purpose of this patented invention to expedite the learning process of children with respect to protecting themselves from various deviant members of a population including, but not exclusive of, a pornographer, prostitution ring member, family member or other trusted adult, or a priest. This type of invention promotes self worth and the ability to self-protect from outside influences that would attempt to corrupt or harm the young or older child in any way. This invention is meant to enable the reader to become autonomous with respect to protecting his or her body, well-being and person, including the psyche and mental wholeness, thereby disabling an outside source from injuring or harming the child in any physical or psychological way.

The present invention generally relates to the field of talking novelty devices or toys or novelty device assemblies. More specifically, the present invention relates to a soft plush toy with a talking apparatus and associated book or picture book containing illustrations on at least one page, which conveys positive messages to very young or older children, especially messages related to acceptable behavioral and psychological patterns of safety or protection through reinforcement of statements made and understood by the child. This type of invention gives the child, a greater feeling of participation in the reading process, and stimulates the child's interest in reading and protecting herself through the use of the voice messages contained within the plush toy, and which are meant to be emanating from the mythical or fictional character within the story, as represented by the soft toy.

It is the tendency of both younger and older children to be uncommunicative or resistant to discussing these types of abuses, which renders the child less susceptible of benefiting from any sort of therapy process or learning a new behavior, particularly if the child has or is encountering intra-family or trusted adult problems described above. It was thus desired in the prior art to provide a means to bridge this communication gap of a child, and to focus on the problem(s) in a non-threatening or frightening way.

It is known to those familiar in the art to provide a children's toy in the form of a soft plush toy animal and in one embodiment, will come with a battery powered voice or music microchip type device embedded within the toy and operable by a switch via a button on the exterior of the toy. Such a microchip or device will be preprogrammed with different words, phrases, animal-like or mythical character sound messages, and will be accompanied by classical music playing in the background, each of which is operable by the user operating a mechanism in the form of a button on the exterior of the toy.

The theme of the story will be relating to, but not exclusive of sexual, verbal, physical, or emotional abuse. Some readers will already be contending with the same or similar issues or are being negatively affected in these ways by persons with alcohol or drug abuse problems. Other readers will have none of the issues described or have no contact with persons described above. The impact that a person with these types of behaviors has on the emotional and or psychological behavior and well being of a very young to an older child will be typified through events in the story book.

The reader will ideally identify with the primary human character in the story who is emotionally attached to the magical character, which will always be represented by the novelty plush toy. The magical figure represented by the novelty toy is responsible for saving the human character in the story or helping him to save himself from the offending adult and/or activity in the story and through the use of the audible messages conveyed from the toy, the reader will also learn to save himself from this type of harm.

There is provided by the present invention a psychotherapeutic and behavioral device wherein a story book setting depicts a traumatic event in the character's life, to which the reader can identify, and through the story book model the child reader is encouraged to identify with the story book character and begin to exhibit the positive behaviors depicted in the story.

It is therefore a principal objective of the present invention to provide a psychotherapeutic and behavioral device comprised of a book and a soft plush toy with an audio activator and audible device mechanism for a child to use who may or may not otherwise be capable of communicating words or phrases that will protect him or her from offensive, abusive persons.

It is a further objective of the present invention to provide a story book and character in the form of a toy that stimulates the reader to communicate in areas wherein he or she would otherwise be reluctant to speak out.

It is still another objective of the present invention to provide a psychotherapeutic and behavioral tool in the form of a book and associated toy deemed to be educational, which is useful in a broad range of situations, described above in the Summary of the Invention, and yet which is relatively inexpensive to manufacture. The present invention, together with attendant objects and advantages, will become more apparent, and will be best understood by those persons having ordinary skill in the art to which the present invention pertains with reference to the detailed description below and taken in conjunction with the accompanying drawings.

OVERVIEW

Disclosed herein is a unique, attractive and appealing children's educational book construction coupled with a soft plush toy. In accordance with the present invention there is provided an educational toy comprising a first Article having an audio device, the audio device being responsive to an output signal to produce a predetermined audio message that is described in a section of the book that relates directly to the toy and a message that is to be reinforced through an audio message. The audio message will be played based on the output signal that is generated via a button device attached on the exterior surface of the plush toy which triggers the activation device.

The first Article comprises a book, each page (and not necessarily each page) of which has a said audio message associated with it. The book will contain a cue in the form of a phrase or instruction indicium as to when the reader should activate the voice or sound from within the toy via the activator button. The story book includes a hard front and back cover, and a plurality of pages there between. The covers and the pages are bound together in a conventional manner in which books are bound. The material will initially be bound with hard front and back covers, and in later publications or releases, the book will be spiral bound as a strong paperback type of material known to those familiar with the art as a paperback. The front cover of the story book will carry indicia in the form of a title, as well as an illustration relating to the main theme or subject and one or both of the main characters addressed therein or the means to attach a likeness of the soft plush toy thereto. Each page has text printed thereon accompanied by illustrations of the character, with each page not necessarily containing an illustration. Depending upon the version of the book, and based upon the demographic and age group targeted as the reader of said book, there will be more and larger colorful pictures. Via the illustrations, it is anticipated that the reader will associate herself with the human character in the story, and in turn within the scope of the interactive environment, further reinforce the behavioral changes desired in the reader. This interaction between the reader and the character and the environment vis a vis the plush toy, is purposed to teach the reader the desired behavioral patterns of self-protection from sexual predators or other abusive types of adults. The character and plush toy are intended to encourage enthusiasm from the reader which further inspires the reader to repeatedly practice the voice messages in his or her own personal experience, thus reinforcing the behavior and enhancing the use and assimilation of those patterns.

The second Article comprises a soft plush novelty toy known to those skilled in the arts to be embodied in multiple formats, sizes and shapes. The toy is configured to resemble the same figure as relating to or being one of the primary characters in the story. Thereby the book becomes readily recognizable to the child. The novelty toy will have magical or ethereal adornments and will be attached to the toy in a fashion appropriate for the age group and adhering in strict accord with toy safety laws known to those skilled in the art.

BRIEF DESCRIPTION OF THE DRAWINGS

FIG. 1 is a perspective view of one embodiment of the story book with an open and frontal view of a sample of pages and illustrations whereby the character associated with the plush toy has textual words, which cue the reader that he/she should activate the voice apparatus on the toy. There is also a side view of the toy with an embodiment of a button attached which when pressed, activates words or phrases and sounds from the toy embodied in FIG. 1 as NO, or I'll tell, a horse whinny and music, illustrating the audible signal generator housing stored inside, along with the cover section comprised of a trap door and latch for which the purpose is to allow a user access to the audio device within the toy and from which the housing will be opened to change the battery. All is in accordance with the present invention.

FIG. 7 is one embodiment of a block diagram for teaching children desired behavioral and psychological patterns of safety against child abusers of any sort based on psychologically sound practices known to those skilled in this art (as described in the Background of the Invention above), and is in accordance with the present invention.

DETAILED DESCRIPTION OF THE PREFERRED EMBODIMENT

The following descriptions illustrate some exemplary embodiments of the disclosed invention in detail. Those of skill in the art will recognize that there are numerous variations and modifications of this invention that are encompassed by its scope. Accordingly, the description of a certain exemplary embodiment should not be deemed to limit the scope of the present invention.

Definitions

The term comprising as used herein is synonymous with including, containing, or characterized by, and is inclusive or open-ended and does not exclude additional, unrecited elements or method steps.

Description

All references cited herein are incorporated herein by reference in their entireties. To the extent publications and patents or patent applications incorporated by reference contradict the disclosure contained in the specification, the specification is intended to supersede and/or take precedence over any such contradictory material.

The detailed description below discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

The present invention provides a soft plush novelty toy or animal having a book associated with it and will be tailored to multiple applications. The soft tactile nature of the toy assists in having the child respond in a positive manner to, and form an attachment with the toy. However, it is also within the contemplation of the present invention that other figure forms will be used.

It is to be understood that while the scenes depicted in the story book [12] relate to sexual abuse, other childhood trauma situations or other serious types of abuse perpetrated by persons exemplified herein as members of a church, school, hospital worker or by said persons involving drug, alcohol, physical, or emotional abuse are also within the scope of the present invention.

There is thus described a psychotherapeutic and behavioral device which can be useful to children from the ages of 3 to 10, and not inclusive thereof, and can be particularly useful with non-verbal or non-expressive children.

One skilled in the art will realize that there has been disclosed a psychotherapeutic and behavioral story book and novelty toy that engages any child, whether withdrawn, resistant or non-verbal or compliant and verbal, and encourages the child to become involved, which stimulates self-insight, facilitates communication, aids in personal growth and self-protection, and is relatively inexpensive to manufacture.

The following detailed descriptions of the story book and the plush novelty toy are presented to enable one of the ordinary skilled in the art to make and use the invention and to incorporate it in the context of particular applications. Modifications and uses in different behavioral and psychological educational applications will be readily apparent to those skilled in the art, and the general principles defined herein will be applied to a wide range of embodiments. Thus, the present invention is not intended to be limited to the embodiments presented, but is to be accorded the widest scope consistent with the principles and novel features disclosed herein.

The present invention provides a novel and useful toy and more particularly, a soft plush toy integrally incorporating a book which will be used to teach and reinforce a specific behavioral pattern relating to self-protection against sexual and other types of child abuse.

Story Book

Figure 1:
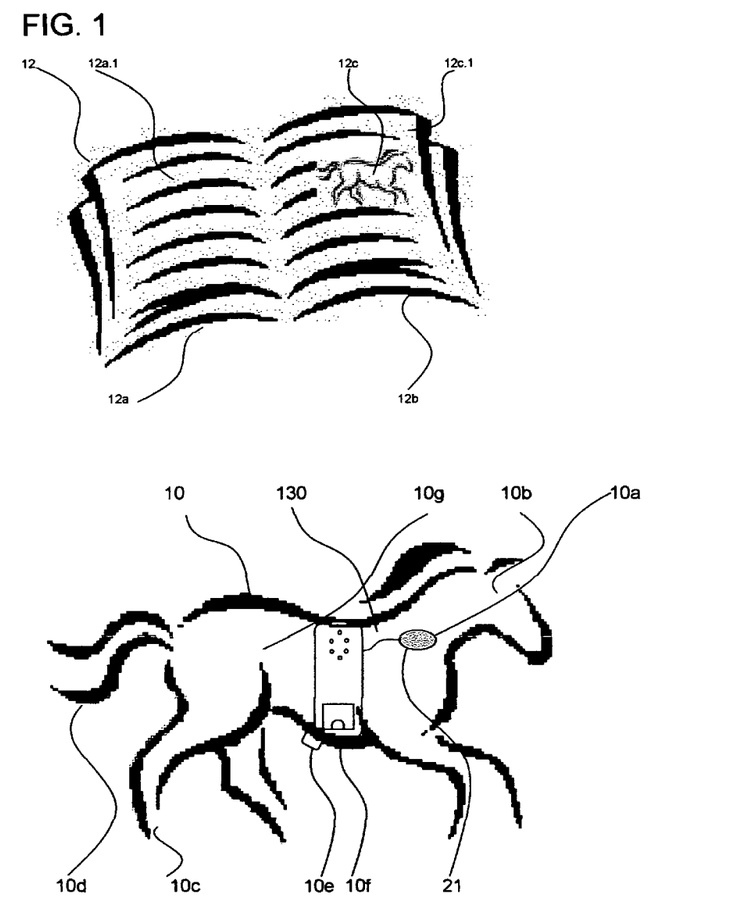
Figure 2:
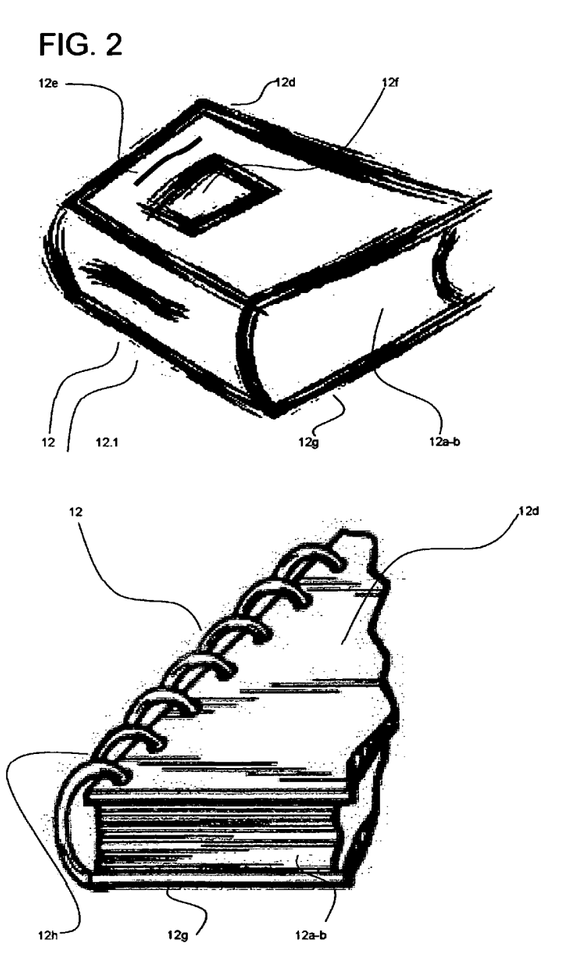
FIG. 2 is a closed view of one embodiment of the book indicating the appearance of hard front and back covers with a title and an illustration on the cover, as well as another embodiment of a fragmentary view of the book being spirally bound containing soft covers of a cardboard type construction, and is in accordance with the present invention.
Figure 3:
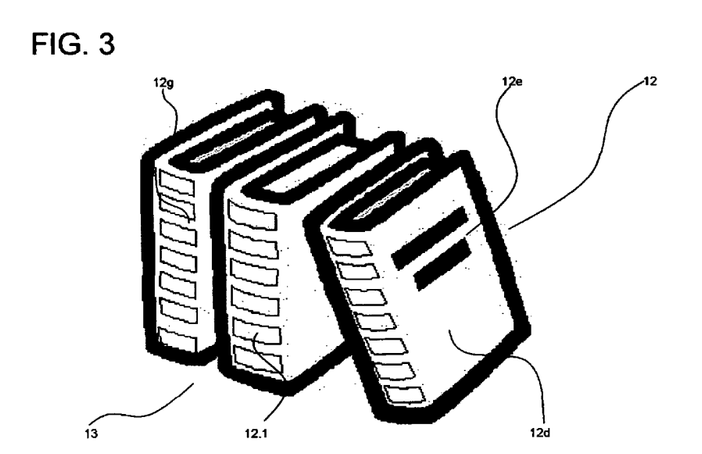
FIG. 3 is one embodiment of a view of multiple books that will indicate a series of books or age-specific versions of the book containing the same animal depicted as the character in the story embodied by the toy; or that the characters and associated words or sounds—including background music—will be different to target a separate psychological behavior specific to the reader's age group, and is in accordance with the present invention.

As illustrated diagrammatically in FIGS. 1-3, the present invention is a story book [12], associated with a soft plush novelty toy [10], having a front cover [12*d*] back bone [12.1], back cover [12*g*], and a plurality of pages [12*a*, 12*b*]. The front cover [12*d*] and the back cover [12*g*] will be either of a soft or hard conventional book material. The pages are successively positioned between the front cover [12*d*] and the back cover [12*g*] and are hinged via the backbone [12.1]. The book will contain indiciums [12.c.1] as illustrated in FIG. 1. As illustrated in FIG. 2, the binding will be of a hard front and back cover and glued together for flipping pages in a usual manner for conventional books, or of a spiral type [12h] where the front [12d] and back covers [12g] will be made of a soft cardboard type of binding. The front cover [12d] has text [12e] printed thereon, with a title relating to a main theme or character(s) of the story book [12], and will have an illustration [12f] containing a picture of either (or both) of the main character(s) or the animal-like character who will teach or save the primary, human character appearing in the story book [12] and which is represented by the toy [10]. The story book [12] concerns a figure, animal or person fictional or imaginary to whom the young reader can readily identify.

This primary human character will be of a male or female gender and the story line will be geared toward psychologically and behaviorally known structures, and a nature or writing styles such that they will make the character more identifiable to that gender of reader, should that become relevant to the learning experience of the reader. In addition, there will be a second character who is there to teach the reader the desired behavior, and which is depicted by the soft plush toy. The figure depicted as a person in the story book will be one of the reader's age and or peer group. The second character will be depicted by the toy and will be based on a real animal or doll but will have the power of speech whereby it can prompt the reader to practice and eventually learn the desired behavioral patterns in a safe and imaginary environment; along with the magical ability to escape in some fashion represented herein as flying or swimming underwater so that the character can save the child in the story from trauma, pain or abuse in an imaginary way. The structure of the characters and associated toy makes it more easily identifiable and recognizable to the reader, which can enhance the potential of retaining the desired learned behavior.

As shown in FIGS. 1-3, some pages will may include text only [12a.1] but will may also include an illustration of the character [12c], which either will or will not be specifically related to one of the messages audible from the toy. The text appearing on each individual page imparts some segment of one of the stories being expressed within the story book [12]. In addition, on any given page, a cue and the associated indicium message [12c.1] will be present that will encourage the reader to use the activation device, in the form of a button on the toy [20], that will cause the plush toy to emit either a word or phrase message [10a] appropriate to the animal (in this figure, a horse) as well as to the age of the reader; or a sound that is appropriate to a specific animal illustrated in FIG. 1 as a horse with a neigh, snort and whinny. There will also be various soothing types of music heard in the background of said words, phrases or sounds but not limited to just Classical types of music. This association encourages the child to read the story book [12] with enthusiasm and take the abstract lessons being expressed and learn to apply them to his or her own life.

EXAMPLE 1: "Whenever you wake up in the night and the monster comes in to your room, you must use my voice to help you say 'NO'." EXAMPLE 2: "He whinnied loudly and laughed." EXAMPLE 3: "Without Ebony Dancer, Shiloh whispered in her own voice, 'NO'. Shiloh shouted, "NO!" again even louder." These segments, combined with other segments, provide complete stories proclaiming lessons related to the theme being communicated.

As illustrated in FIG. 3, a series of story books [13] will be provided, each conveying a different theme of child abuse as described in the Summary of the Invention section above. A story book [12] will be individually adapted to a specific age group, wherein the story line and characters are identical but the vocabulary and writing style will be at the reading and comprehension level, both intellectually and psychologically, of the targeted age group of the reader. The themes relate to a wide range of topics pertaining to the safety and well being of the child that will promote his or her personal safety and growth, as well as psychological and emotional mental stability in the face of an adult figure attempting to abuse the child inappropriately or illegally.

A story book [12] depicting a physical and emotional safety related theme could include stories instructing the reader about interaction with strangers, family members and trusted friends or authority figures in face-to-face encounters or on the internet and how to stand up for one's rights as a child; how to establish personal boundaries safely and within the construct of the child's learning ability and psychological adaptability or threshold, in the face of personal danger from any authority figure.

There exist many themes, the stories of which will relate to each theme. The primary focus of this particular series [13] of stories and themes is that of child abuse and the saving of the main character through the use of a pet, animal or magical figure in the form of the character within the story as it is embodied by the educational soft plush toy [10], though it is not limited in scope to these topics and will be depicted in stories that will be based on face-to-face encounters or on the internet.

In summary, the story book teaches the reader desired behavioral patterns of self-protection against sexual predators, and through the incorporation of the reader's own personal experience, the reader is encouraged to identify with the human character in the story book and to trust the plush toy associated to the other story character as well which is intended to help the child save himself from the aforementioned negative adult behavior. This promotes the reader's interest and encourages the child to find his own strength through that of the human and magical characters of the story, thereby learning the positive and desired behavioral and psycho-social patterns thus enhancing the child's safety and autonomy.

Thus, with reference to FIG. 1, the voice message generated by the audible signal generator [100a] inside the toy will be the same as the message [12c.1] printed on the page [12a or 12b] of the book [12] or from the indicium message on said page prompting the child to press the button on the toy to activate the audio device. Here a page of the book will contain a message depicted above in the Detailed Description of the Preferred embodiment. Each visual message or indicium prompt on a page has an associated individual voice or sound message, which is accompanied by music stored in the memory of the toy whereby an appropriate output signal can be produced to generate a corresponding audio message [10a]. The soft toy [10] thus speaks to the child telling the child what the appropriate and desired behavior is, and how the child can use those words to protect herself from the abuse contained in the theme of the story.

Soft Plush Toy

As illustrated diagrammatically, the educational toy of the invention comprises a soft, plush toy [10] in the form of a horse and is shown in FIG. 1, together with a book [12]. The soft plush toy [10] includes a tail portion [10d], hoof-like portions [10c], a body portion [10g], and a head portion [10b] attached thereto. It is of a soft and pliable construction and will be of a stuffed animal type construction with a soft furry surface. It will also have adornments and additional features not herein illustrated but known to those skilled in the art to be worn by a mythical, ancient or magical being or animal. [10e]

indicates a cover section comprised of a trap door and latch [10f] with the purpose of allowing a user access to the audio device within the toy; wherein the audible signal generator [100a] is stored and housed [100] internally within the toy [10]. The audible signal generator [100a] will be accessed from the cover section through the latch [10f] on the trap door [10e]. The mechanism(s) that triggers the sounds from within the toy will be in the form of a button [20] attached to the toy, shown herein to reside at the top of the horse's back, on the body [10g] near the withers.

The toy carries the audible signal generator [100a] internally within a housing [100] and is opened externally via the latch [10f], with the purpose of allowing a user access to the audio device within the toy; and is conveniently located in a central point on the animal as illustrated herein as the underbelly of the horse. In FIG. 1, the audio device is illustrated as being located within the body [10g] of the horse and will be powered by a battery [103] or by any other conventional and appropriate power source for generating an audible sound through such a device. The housing [100] and audible signal generator [100a], along with the battery [103], if required, is embedded within the body [10g] of the animal and is accessible from the bottom thereof, depending on the type of animal which is depicted by the toy [10]. The audio device will be invisible to the child and will be imbedded entirely within the plush toy [10].

It is important to note that, although shown in the shape of an animal, the soft plush toy [10] can be any desired mythical character or object and will vary widely while remaining within the scope of the present invention. The young reader will identify, become attached to, and thus learn from the soft plush toy [10], thereby attaining the desired psychological and behavioral pattern changes.

Audible Signal Generator

Figure 4:
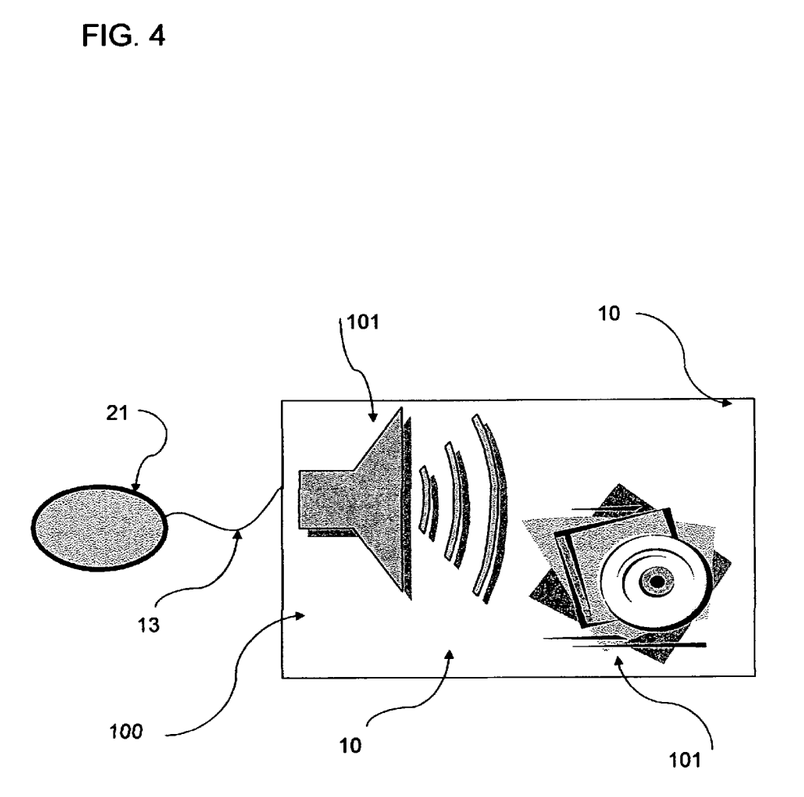
FIG. 4 is one embodiment of a simple diagram of an audio device and the activating button attached to it illustrating how the voice or sound activator is attached to the voice mechanism, which is then housed within the plush toy, and is in accordance with the present invention.
Figure 5:
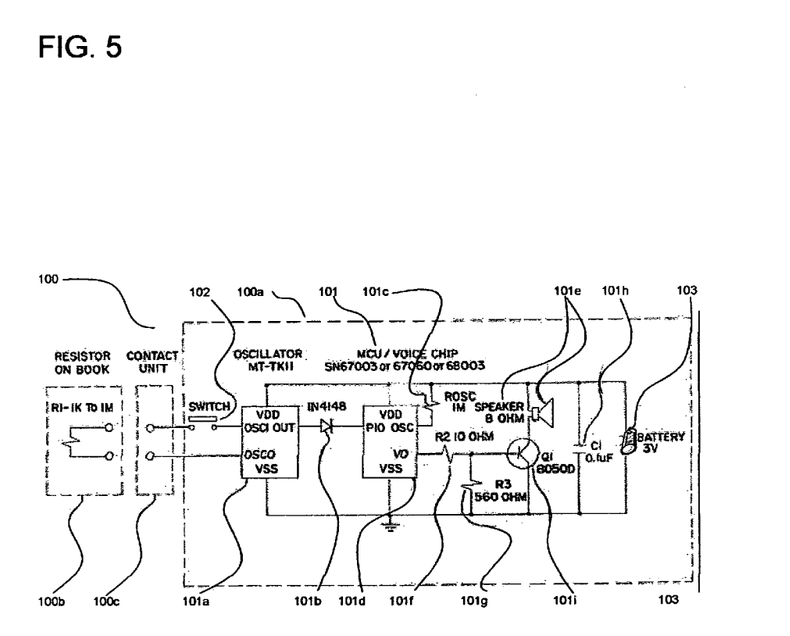
FIG. 5 is one embodiment of a circuit diagram illustrating a voice apparatus (with all correlated components), which will become readily apparent to those skilled in the art that certain modifications could be required for the specific purpose and definition of this invention. (See details in the Detailed Description below.) All this is in accordance with the present invention.
Figure 6:
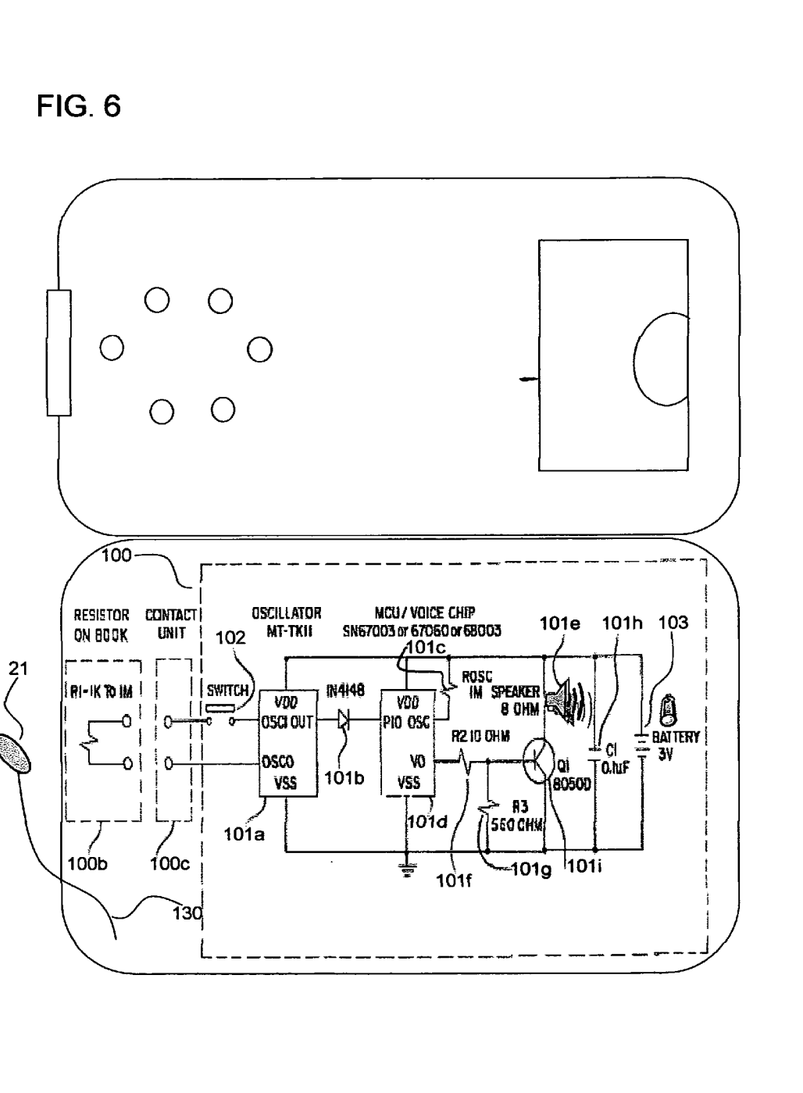
FIG. 6 is one embodiment of a perspective view illustrating the assembly for the audible signal generator enclosed within a housing, including wiring and mechanisms from which the sound will be emitted through a button. There will be no pull string for activating said audible signal generator. All this is in accordance with the present invention.

As illustrated diagrammatically in FIGS. 4-6, the audible signal generator [100a] is contained within a housing [100], which is imbedded within the toy [10] and will comprise a microprocessor [101] capable of storing audio messages [10a] and sound patterns that have been pre-programmed into its memory and a battery [103] to power it.

In use a child will pick up the soft plush toy [10] and press the button [20], which will cause the audible signal generator [100a] to activate thereby causing the appropriate sound [10a] to be emitted from the toy via a speaker [101e] (amplifier and microphone included therein) within the audible signal generator [100a]. The audio message [10a] corresponds to a message [12c.1] contained within the story book [12], or an indicium on a page of said book that prompts the child to press the button on the toy, whereby the child repeats the voice message [10a] thereby reinforcing the positive behavioral pattern.

Referring to FIGS. 4-6, these illustrate both simple and complex diagrams which will become apparent to those skilled in the art. More specifically, a complex circuit diagram (the audible signal generator [100a]) is illustrated in detail in FIG. 5, and in FIG. 6 it is embodied within the housing as a small sample to illustrate it's positioning inside the toy, for creating and emitting a preferred embodiment of the audible signal from the toy [10].

FIG. 4 is a simple diagram of an audio device and the activating contact point(s) attached to it illustrating how the voice or sound activator is attached to the voice mechanism which is then housed within the plush toy item. [20] is the button, which will be attached on the exterior of the toy and in turn, will be attached to the voice mechanism wiring [130] which is wired directly to the audible signal generator [100a] within the housing [100], and which will be opened for maintenance or troubleshooting via the cover [100d] which is attached to the bottom portion of the housing through a normal type hinge [100f]. [101e] is the microphone and speaker-like device and [101h] is the CD-like capacitor device utilized to store all of the voice, music and sound messages via the MCU/Voice chip [101]. All this is in accordance with the present invention.

FIG. 5 illustrates a circuit diagram, a.k.a. audible signal generator [100a], as a preferred embodiment of it and a box in which it is housed, hereinafter referred to as the housing [100] as shown in FIG. 6. As illustrated, this portion will be an integral (and internal) part of the plush toy [10].

The circuit [100a], the toy resistor [100b] and contact unit [100c] control the audible signal generator [100a] from within the toy [10]. The button [20] is the contact point of the signal activator, which has a contact unit [100c]. The contact unit [100c] is for use with the toy resistor [100b] (contact) on the plush toy [10]. The toy [10] includes a power source e.g., a three volt battery [103] and a switch [102]. The circuit [100a] is normally open but becomes closed when the switch [102] is closed and the contact unit [100c] of the toy [10] touches the toy resistor [100b].

To obtain a specific message corresponding to a certain page of the story book [12], an impedance of the toy resistor [100b] can vary from one thousand to one million ohms. When the contact point as the button [20] on the toy [10] touches the toy resistor [100b] it electrically connects to an oscillator [101a] which causes the oscillator [101a] to produce an output waveform at a certain frequency depending on a value of the toy resistor [100b]. An exemplary oscillator is Model number MT-TK11 manufactured by HHC located in Taiwan. However, this device will be so simple that it only needs to generate the sound in a specific order that correlates to pages in the story book [12] and will not require an electrical impulse to activate it.

Thereafter, the output waveform of the oscillator [101a] is fed via a diode [101b] to an input port of a voice chip [101d]. An exemplary diode is Model number IN4148 manufactured by Phillips located in Hong Kong, and exemplary voice chips are micro controller unit MCU [101], model numbers SN67003, SN67060, and SN68063 manufactured by Sonix located in Taiwan. The voice chip [101d] counts the number of pulses of the input waveform that occur within a predetermined time period, e.g. three milliseconds. To accommodate the counting of pulse signals, the voice chip [101d] includes an oscillator [101a], which is powered by the power source [103] via a first resistor [101c]. Thereafter, to determine the specified message, the voice chip [101d] compares the counted number of pulses to an internal lookup table. The lookup table includes information corresponding to the printed subject matter found in the story book [12]. According to the lookup table, a sound output corresponding to the specified message is read out of a read-only memory (ROM) of the voice chip.

The sound output passes through an amplifier circuit which includes a second resistor [101f] connected from the sound output of the voice chip [101d] to a base of a transistor [101i], and a third resistor [101g] connected from the base of the transistor [101i] to ground. An exemplary transistor is Model number 8050 manufactured by Samsung located in South Korea; however, equivalent transistors can be used. A collector of the transistor [101i] connects to a speaker [101e], which connects to a capacitor [101h] and the power source [103] in shunt. Those of ordinary skill in the art will appreciate that the resistance and capacitance values shown in FIG. 5 are for exemplary purposes only, and that other values could be used to operate the audible signal generator [100a] (circuit) known to those skilled in the art.

There is also a situation wherein the message does not correlate to a specific page in the book but to a specific type of behavioral message introduced and taught within the story line of the story book [12]. There is also the situation wherein the sound is of a musical type and is played in the background on a track underneath or embedded within the sound message itself.

As illustrated in FIG. 6, the housing [100] is shown in an open state with the cover [100d] in an open position to reveal the audible signal generator [100a] within. The embodiment of the circuit diagram itself, shown without true detail, is for illustration purposes only to point out how it is imbedded within the housing. The diagram illustrates how the button [20] as the contact point to the generator attaches to it via the voice mechanism wiring [130]. The housing itself is opened via a cover section comprised of a latch and trap door whereby the latch [10f] has the purpose of allowing a user access to the audio device within the toy which is then located on the trap door [10e] and opens via a standard hinge [100f]. The audible sound is emitted from the speaker [101e] through holes [100e] on the cover. The speaker [101e] capacitor (storage-like device) [100h] and power source in the form of a standard 3 volt battery [103] are also illustrated herein.

From the foregoing detailed description, it will be evident that there are changes, adaptations and modifications of the present invention, which come within the province of those skilled in the art. Thus, by way of illustrations drawn herein, and not of limitation, the three dimensional figure or plush toy animal will have an extent greater than the thickness and width as depicted; and that the toy assembly will be built, in such a way as to not depart from the spirit of the invention and be considered as within the scope thereof as limited solely by the claims appended hereto.

The embodiments described above and shown herein are illustrative and not restrictive. The scope of the invention is indicated by the claims rather than by the foregoing description and attached drawings. The invention will be embodied in other specific forms without departing from the spirit of the invention. The novelty device will include dolls, animals, and other figures as recognized by those of ordinary skill in the art. Also, the specific circuitry used to generate an audible signal is known to those skilled in the art to come in different constructions, both of basic or complex operation, without departing from the claimed invention. Accordingly, these and any other changes, which come within the scope of the claims, are intended to be embraced herein.

While there has been described what is at present considered a preferred embodiment of the invention, it will be obvious to one skilled in the art that various changes and modifications will be made therein without departing from the invention; and it is, therefore, aimed in the appended claims to cover all such changes and modifications as followed in the true spirit and scope of the invention.

| * Item | Document Number Country Code-Number-Kind Code | Date MM-YYYY | Name | Classification |
|---|---|---|---|---|
| A | U.S. Pat. No. 5,795,213 | 08-1998 | Goodwin, Richard P. | 446/279 |
| B | U.S. Pat. No. 6,106,358 | 08-2000 | McKenzie, Leila L. | 446/299 |
| C | U.S. Pat. No. 6,434,769 | 08-2002 | Koenig, Eric | 5/636 |
| D | U.S. Pat. No. 5,059,149 | 10-1991 | Stone, Timothy J. | 446/73 |
| E | U.S. Pat. No. 6,000,987 | 12-1999 | Belin et al. | 446/175 |
| F | U.S. Pat. No. 7,261,612 | 08-2007 | Hannigan et al. | 446/175 |
| G | U.S. Pat. No. 6,330,427 | 12-2001 | Tabachnik, Joel B. | 434/317 |
| H | U.S. Pat. No. 7,035,583 | 04-2006 | Ferrigno et al. | 434/308 |
| I | U.S. Pat. No. 6,160,540 | 12-2000 | Fishkin et al. | 345/184 |
| J | U.S. Pat. No. 6,882,824 | 04-2005 | Wood, Michael C. | 434/308 |
| K | U.S. Pat. No. 6,780,076 | 08-2004 | Horchler et al. | 446/29 |
| L | U.S. Pat. No. 6,193,579 | 02-2001 | Mak, Danny Wai Keung | 446/297 |
| M | U.S. Pat. No. 5,279,514 | 01-1994 | Lacombe et al. | 446/297 |
| N | U.S. Pat. No. 4,341,521 | 07-1982 | Solomon, Laura B. | 434/236 |
| O | U.S. Pat. No. 6,089,943 | 07-2000 | Lo, Wai Shing | 446/175 |
| P | U.S. Pat. No. 5,387,107 | 02-1995 | Gunter, Larry et al. | 434/238 |
| Q | U.S. Pat. No. 2,002,019, | 05-1921 | | 261/153 |
| R | U.S. Pat. No. 5,746,637A | 05/1998 | Hunt, Waldo Henley | 446/72 |

What is claimed is new and desired to be protected by Letters Patent is set forth in the appended claims:

1. An educational toy adapted to teach children comprising
   (a) a soft plush toy comprising a body portion, extremity portions, a head portion, and an interior portion;
   (b) an access portion on the exterior of said body portion;
   (c) an audio device portion within said interior portion comprising an audible signal generator which emits audible sounds from within the toy;
   (d) an actuator attached to the exterior of said body portion which is configured to activate said audible signal generator,
   (e) a cover section on the exterior portion of said body portion comprising an access door and a latch which is configured to provide access to said interior portion; and
   (f) an interactive story book comprising a cover and a plurality of pages having indicia thereon, where the pages comprise a plurality of instructional cues instructing the reader to activate the actuator on the soft plush toy;
   wherein the audio device portion of the soft plush toy is configured to store audio messages in a sequential order such that audio messages in an order corresponding to the indicia of the book are generated in response to repeated activations of the actuator.

2. The educational toy of claim 1, wherein said actuator is a button.

3. The educational toy of claim 1, wherein said actuator is a pull ring.

4. The educational toy of claim 1, wherein said audio device portion further comprises:
   (a) a power source;
   (b) a speaker device;
   (c) an oscillator;
   (d) a voice chip;
   (e) a microcontroller and
   (f) memory configured to store data including words, phrases, animal noises, and background music.

5. The educational toy of claim 1, wherein the soft plush toy represents a character in a story depicted in the book.

6. The educational toy of claim 1, wherein at least some of the the audio messages produced by the soft plush toy correspond to messages printed in the book.

7. The educational toy of claim 1, wherein the indicia on the pages of said book comprise text and illustrations.

8. The educational toy of claim 1, further comprising a series of books, where each book comprises a cover and a plurality of pages having indicia thereon, the pages comprising a plurality of instructional cues instructing the reader to activate the actuator on the soft plush toy.

9. The educational toy of claim 8, wherein the books comprise stories which are configured to be used by children of different age groups.

* * * * *